(12) United States Patent
Rowe (10) Patent No.: US 7,083,520 B2
(45) Date of Patent: Aug. 1, 2006

(54) IN-ROOM GAME PROMOTION AND DEMONSTRATION METHOD AND SYSTEM

(75) Inventor: Rick Rowe, Henderson, NV (US)

(73) Assignee: IGT, Reno, NV (US)

( * ) Notice: Subject to any disclaimer, the term of this patent is extended or adjusted under 35 U.S.C. 154(b) by 20 days.

(21) Appl. No.: 10/242,149

(22) Filed: Sep. 11, 2002

(65) Prior Publication Data

US 2004/0048670 A1    Mar. 11, 2004

(51) Int. Cl.
*A63F 9/24* (2006.01)
*A63F 13/00* (2006.01)

(52) U.S. Cl. .............................. 463/42; 463/1; 463/25; 463/40; 705/14

(58) Field of Classification Search ................. 463/16, 463/25, 29, 40–43, 1; 725/23, 74, 76, 78, 725/82, 83, 133, 141; 705/14
See application file for complete search history.

(56) References Cited

U.S. PATENT DOCUMENTS

| | | | |
|---|---|---|---|
| 5,265,874 A * | 11/1993 | Dickinson et al. ............. | 463/25 |
| 5,475,740 A * | 12/1995 | Biggs et al. ............. | 379/91.02 |
| 5,488,411 A * | 1/1996 | Lewis .......................... | 725/83 |
| 5,537,314 A * | 7/1996 | Kanter .......................... | 705/14 |
| 5,638,426 A | 6/1997 | Lewis | |
| 5,800,268 A | 9/1998 | Molnick | |
| 5,851,149 A | 12/1998 | Xidos et al. | |
| 5,902,983 A * | 5/1999 | Crevelt et al. ............. | 235/380 |
| 5,983,196 A * | 11/1999 | Wendkos ..................... | 705/14 |
| 5,990,885 A * | 11/1999 | Gopinath .................... | 345/716 |
| 6,004,211 A * | 12/1999 | Brenner et al. ............... | 463/40 |
| 6,015,344 A * | 1/2000 | Kelly et al. .................... | 463/16 |
| 6,113,495 A * | 9/2000 | Walker et al. ................ | 463/42 |
| 6,183,362 B1 * | 2/2001 | Boushy ....................... | 463/25 |
| 6,264,560 B1 * | 7/2001 | Goldberg et al. ............. | 463/42 |
| 6,409,602 B1 * | 6/2002 | Wiltshire et al. ............. | 463/42 |

(Continued)

FOREIGN PATENT DOCUMENTS

WO    WO-02/01458 A2 *   1/2002

OTHER PUBLICATIONS

International Search Report from corresponding PCT application PCT/US03/27137 mailed Jan. 15, 2004.

*Primary Examiner*—Corbett B. Coburn
*Assistant Examiner*—Milap Shah
(74) *Attorney, Agent, or Firm*—Beyer Weaver & Thomas, LLP (57) ABSTRACT

A system includes a media distribution system including displays located in guest rooms of a hotel. A game play system and player tracking system of a casino are linked to the media distribution system. A player located in a guest room is confirmed as enrolled in a player rewards program by confirmation of identity with the player tracking system or by enrolling the player in the program by sending identification information from a hospitality/reservation system of the hotel to the player tracking system. Game data is provided from the game play system to the media distribution system and is distributed to the player's in-room display. The data is used to generate a game for play by the player on a promotional/demonstrative basis without placing a wager or bet. The player's game play activities are tracked for use in generating a player reward independent of the outcome of the games played.

20 Claims, 3 Drawing Sheets

U.S. PATENT DOCUMENTS

| | | | |
|---|---|---|---|
| 6,554,709 B1 * | 4/2003 | Brenner et al. | 463/42 |
| 6,572,477 B1 * | 6/2003 | Hightower | 463/41 |
| 2001/0036858 A1 * | 11/2001 | McNutt et al | 463/25 |
| 2002/0077712 A1 * | 6/2002 | Safaei et al. | 700/93 |
| 2002/0147047 A1 * | 10/2002 | Letovsky et al. | 463/42 |
| 2002/0147640 A1 * | 10/2002 | Daniele et al. | 705/14 |
| 2003/0050806 A1 * | 3/2003 | Friesen et al. | 705/5 |
| 2003/0083943 A1 * | 5/2003 | Adams et al. | 705/14 |

* cited by examiner

IN-ROOM GAME PROMOTION AND DEMONSTRATION METHOD AND SYSTEM

FIELD OF THE INVENTION

The present invention relates to games and gaming devices, and more particularly to a method of permitting a player to play a game on a promotional or demonstrative basis.

BACKGROUND OF THE INVENTION

Casinos are continually seeking ways to expose their patrons to new games and entice those patrons to play both those new games as well as existing games. When a new game is released, the game may be advertised extensively to expose it to prospective patrons. This method of introducing new games has numerous pitfalls. First, in order to play the new game, the patron must locate the game. A casino may have tens of thousands of square feet of space filled with banks of gaming machines and tables games. Thus, a patron may find it difficult to locate a specific game.

In addition, patrons generally play games they are most familiar with. The familiarity of the game supports the patron's belief that they have a better probability of winning the game. Patrons are often very reluctant to play a game they do not know how to play, believing that they will simply lose the game and their bets.

As one means to entice players to play both new and existing games, casinos often offer player reward programs. These programs offer players awards based on their play of gaming machines and table games. These awards are generally separate from the winnings awarded to a player for a winning outcome of a game. These player reward programs generally require that a player sign up for the program and then use a player tracking card. When the player signs up for the program, an account is opened for them. When the player plays a game, their game play is tracked at the game. The player's player tracking card is used to identify them, and the game play information is associated with their account. In this manner a casino may determine, for example, that a particular patron has bet a particular sum of money over time or has played particular games. The casino can then reward the player for their game play. When rewarded, the players are further enticed beyond the normal play of the games, to play the games.

However, the player reward program still does not solve the problem of getting players to play new games. For example, even players signed up with the rewards program would have to locate the new gaming machines. These players are also likely to be just as reluctant to play a new game as any other player.

In addition, while the player reward program has many advantages, those advantages are not realized if the player does not sign up for the program. Casinos continue to seek new ways to entice patrons to sign up for their rewards programs and to entice them to play games, including new games or games less frequently played.

SUMMARY OF THE INVENTION

The invention comprises methods and system for presenting a game to a player on a promotional or demonstrative basis. In accordance with one arrangement of the invention, games which normally require a bet or wager to be played are presented to the player without the requirement of a bet or wager. For purposes of exposing the game and convenience to the player, the game or games are presented to the play in the player's hotel room.

In one embodiment, the invention comprises an in-room promotional game play system. The system includes a media distribution system for distributing data, such as game play data and television and movie feeds, to displays located in guest rooms. The displays may comprise televisions. In one embodiment, a set-top box is associated with each television. The set-top box is configured to accept user input, such as selections made using a remote control.

The system includes a player tracking system which is associated with a casino or other gaming establishment. The player tracking system is configured to implement a player rewards program which rewards member players with awards based upon their play of games, independent of the specific outcomes of those games.

The system includes a game play system. The game play system is configured to generate or provide (such as from a memory) game data for presenting a game on a display. In one embodiment, some or all of the sub-systems are linked by communication links, permitting data to be transferred between them.

In one embodiment, the game play system includes a plurality of interfaces which permit data or information to be transferred between and among the various sub-systems. One interface is provided corresponding to the player tracking system, and another corresponding to the media distribution system.

In one embodiment, the system includes a hospitality or reservation system. The game play system includes an interface corresponding to the hospitality system.

One embodiment of the invention comprises a method of permitting a player to play a game on a promotional or demonstrative basis. In one embodiment, the player is first confirmed as a member of the player rewards program. If the player is already enrolled as a member, this step may comprise the player providing identification information.

If the player is not already enrolled, this step may comprise the player enrolling in the program. In one embodiment, the player's information is transmitted from guest information stored at the hospitality system from the player's room reservation or room check-in information. This information is used by the player tracking system to enroll the player.

If the player is enrolled, or once enrolled, the player is permitted to play one or more games. In one embodiment, the games are presented in the player's room. The games are preferably of the type which normally require a bet or wager to play, but which are presented on a promotional or demonstrative basis without the player being required to place a bet or wager.

In one embodiment, game data is transmitted from the game play system to the media distribution system. The media distribution system directs the data to the player's room, where the display displays the game.

The player's play of the one or more games is tracked. In one embodiment, game play information is generated and transmitted to the player tracking system. The game play information may comprise a number of points assigned or awarded to the player. These points may be added to the player's reward account, for use in awarding the player a reward independent of the outcome of the games played by the player.

In one embodiment, when the player is enrolled and the player's play of the promotional games is being tracked, the player is entitled to win randomly assigned awards or bonuses. The awards or bonuses may be randomly distributed to one or more players of all players playing promotional games at a specific point in time or during a period of time.

Further objects, features, and advantages of the present invention over the prior art will become apparent from the detailed description of the drawings which follows, when considered with the attached figures.

DETAILED DESCRIPTION OF THE INVENTION

The invention is a method and apparatus for promoting and demonstrating games. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the invention comprises a variety of systems and methods for promoting and demonstrating games. The systems and methods are particularly suited to enticing players to play new games. The systems and methods are also particularly suited to enticing players to sign up for casino rewards programs and to participate actively in those programs. In one embodiment, the invention comprises providing games for play on a demonstration basis to players in their hotel rooms or similar environments. The invention also comprises a system and method by which players are enticed to join a player rewards program in exchange for the right to play games on a demonstration or "no-pay" basis. These and other aspects of the invention will now be described in greater detail.

Figure 1:
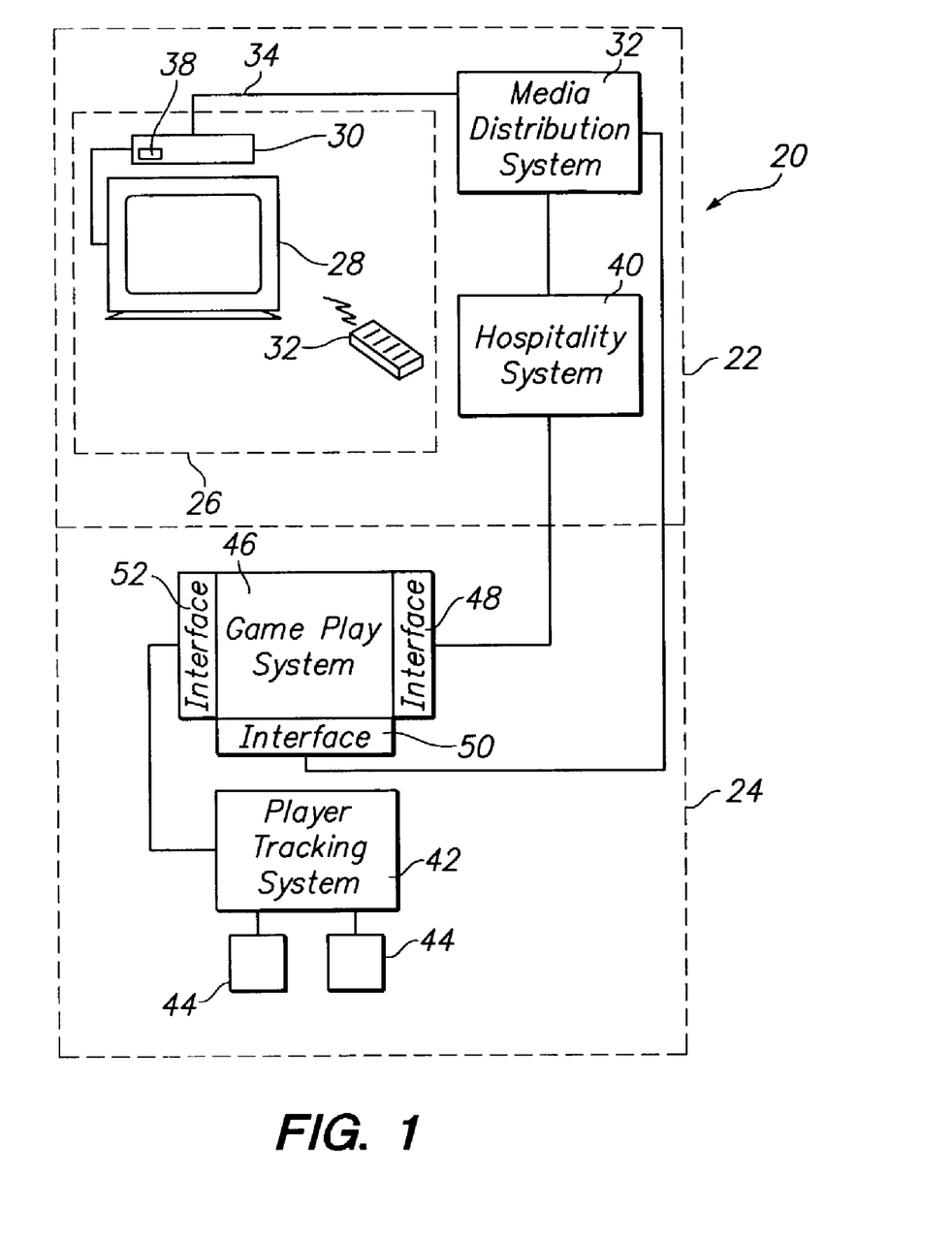
FIG. 1 illustrates one embodiment of a system of the present invention.

Referring to FIG. 1 there is illustrated one embodiment of a game demonstration system 20 in accordance with the present invention. In the embodiment illustrated, the system 20 is particularly adapted for use in a hotel/casino environment. These environments are very well known and thus not described in detail herein. In general, however, the environment comprises a hotel 22 and an associated casino 24. The hotel 22 generally comprises a physical structure at which lodging is provided to patrons. The casino 24 comprises a structure at which various gaming or gambling events are presented. The casino 24 may contain, for example, a plurality of gaming machines and gaming tables at which various games are presented. As is known, the hotel 22 and casino 24 may be in associated or linked structures, providing patrons both access to gaming and lodging at the same general location. The hotel 22 and casino 24 may also be located in entirely different locations.

In one embodiment, the hotel 22 includes a plurality of rooms 26 for providing lodging to guests. Each room 26 includes a television 28 or other display device. The television 28 may comprise, for example, a CRT-type direct view television or various other types of televisions, as now known or later developed.

In accordance with the invention, the room 26 also includes a set-top box 30. The set-top box 30 may be of a variety of configurations. In general, the set-top box 30 is adapted to accept an input, such as an input signal, and provide that input to the television 28 for use in displaying information. As described below, this information may comprise an electronically presented game. The set-top box 30 is also adapted to accept input from a user, such as input from a guest using a remote control 32.

In one embodiment, the set-top box 30 is entirely separate from the television 28. In this manner, existing televisions 28 may be arranged to implement the present invention. In other embodiments, the television 28 may be modified or constructed in a manner to implement the present invention.

In one embodiment, the set-top box 30 includes a communication interface (not shown) for communicating with a media distribution system 32 of the hotel 22. The media distribution system 32 is described in greater detail below. Data is transmitted to and from the set-top box 30 and media distribution system 32 via a communication link 34, such as a cable connection. The data may be transmitted using a variety of data transfer protocols, as is well known.

The set-top box 30 also includes one or more outputs. A connection, such as a cable, may be connected to one of the outputs and to an input of the television 28 for providing data from the set-top box 30 to the television 28. The output may be a composite or component port for accepting a mating plug of a cord.

The set-top box 30 also includes means for accepting user input. This means may comprise a variety of devices. For example, though not shown, the means may comprise a keypad or similar electromechanical device. The means may also comprise a receiver 38. In one embodiment, the receiver 38 is an infrared receiver for receiving an infrared signal from the remote 32. The receiver 38 may also be configured to receive other wireless signals, and may also be arranged to receive a signal over wire.

The set-top box 30 may include a processor for processing instructions and data. For example, the processor may be arranged to generate an output in response to a particular user input.

The multi-media distribution system 32 is preferably one or more devices configured to provide an output to each set-top box 30. In one embodiment, this output comprises data which is used by the set-top box 30 and television 28 to display information. As is known, hotels often desire to provide in-room movies to their guests. In one embodiment, the multi-media distribution system 32 is configured to output a data stream or signal to the set-top box 30 for use by the television 28 in causing a movie to be displayed.

In one embodiment, the media distribution system 32 may include one or more hubs and routers (not shown) for directing particular information to particular rooms 26 (and thus their respective set-top boxes 30 and televisions 28).

By way of example, the media distribution system 32 may be linked to a cable, satellite, or other feed of television signal. This signal may represent a plurality of television channels. The television signal is routed via the media distribution system 32 to the in-room televisions 28, permitting the guest of each room to select particular desired television programming.

In one embodiment, the media distribution system 32 is linked to a movie signal. The movie signal may comprise, for example, the output of a video cassette or DVD player playing a video cassette or DVD. In one embodiment, a plurality of such players may be linked to the media distribution system 32, whereby individual movie feeds may be provided to particular televisions 28.

In one embodiment, the hotel 22 has a hospitality/reservation system 40. Such systems are well known in the hotel industry. The system 40 generally comprises one or more computers. The system is configured to generate reservation data, including a guest's name, address, telephone number and the like. Upon check-in, the status of the guest may be updated, such as by including room number and the like. The system may include various communication links permitting reservations to be made via remote computers, such as via the Internet. The system may also include reservation stations, such as for reservation specialists who accept incoming reservation telephone calls as well as hotel front desk personnel.

The hospitality/reservation system 40 may be connected to the media distribution system 32. As is known, systems exist permitting hotel guests to use interactive features via their in-room televisions to check out, check the status of their account and the like. In the embodiment of the system 20 illustrated, guest requests may be made via the set-top box 30 (such as by input via the remote 32). Guest requests to check-out, check their accounts or the like are routed to the media distribution system 32, and from there to the hospitality system 40. Guest information stored in one or more files or the like at the hospitality/reservation system 40 is obtained and then transmitted back to the guest.

The casino 24 includes a player tracking system 42. Such systems are well known and thus the system 42 will not be described in detail herein. In general, the player tracking system 42 comprises one or more computers which are in communication with one or more gaming machines 44. The gaming machines 44 may be of a variety of types. The gaming machines 44 and the one or more computers are linked by a network of communication links. In general, each gaming machine 44 generates game play information, such as the value of monies or credits wagered by players of the gaming machine, values of winnings paid, number of games played and/or other information. Generally, the information is aggregated and is associated with a particular player. The player may be identified by a player tracking card. This card is encoded with identifying information and may be read by a card reader at the gaming machine 44.

Once a player is identified, the game play data is generated, aggregated and then transmitted to the one or more computers of the player tracking system 32. The generated data may be stored in one or more files. In one embodiment, the generated data may comprise points based upon amounts bet by the player or other gaming machine activities. The point information is transmitted to the one or more computers and a file corresponding to the player is updated.

In one embodiment, a player may be rewarded with an award if the player reaches particular levels of play as identified by the number of points which the player accrues. In this manner, a player is enticed to utilize the player tracking system to obtain awards independent of particular outcomes received while playing games on the gaming machines 44.

In accordance with one embodiment of the invention, the system 20 includes a game play system 46. The game play system 46 preferably includes one or more computers or computing devices. For example, the game play system 46 may include a computer having a processor for executing program code and a memory for storing data, such as computer code. In one embodiment, the computer includes one or more communication interfaces and is thus configured as a server. So configured, the computer is capable of transmitting information to various other devices and is capable of receiving data or information from various other devices.

As illustrated, the game play system 46 is physically associated with the casino 24. As will become apparent, the game play system 46 may be physically located anywhere.

In one embodiment, the game play system 46 includes one or more interfaces permitting interaction between the game play system 46 and other components of the system 20. As illustrated, the system 20 includes a first application interface 48. The first application interface 48 comprises an interface between the game play system 46 and the hospitality system 40. In one embodiment, the first application interface 48 may comprise hardware and/or software. In one embodiment, the hospitality system 40 may operate using a particular language. The first application interface 48 may be a software interface written in XML language which allows information in the language utilized by the hospitality system 40 to be utilized and which converts information to that language for use by the hospitality system 40. As will be appreciated, the particular form of the interface 48 may vary dependent upon the hospitality system 40. Generally, as indicated, the hotel 22 will already have an existing hospitality/reservation system 40. The interface 48 is configured to work with, and thus may be dependent upon, the configuration of the existing hospitality/reservation system 40.

As illustrated, the system 20 includes a second application interface 50. The second application interface 50 comprises an interface between the game play system 46 and the media distribution system 32. In one embodiment, the second application interface 50 may comprise hardware and/or software. The second application interface 50 may comprise, for example, a software interface written in a particular language in similar fashion to the first application interface 48.

As illustrated, the system 20 includes a third application interface 52. The third application interface 52 comprises an interface between the game play system 46 and the player tracking system 42. In one embodiment, the third application interface 52 may comprise hardware and/or software. The third application interface 52 may comprise, for example, a software interface written in a particular language in similar fashion to the first and second application interfaces 48,50.

In one embodiment, the system may include one or more displays other than televisions. An advantage of the system 20 is that it makes use of existing hardware commonly located in guest rooms. In other embodiments, however, the game or games may be presented on other displays. For example, dedicated CRT, LCD, plasma or other types of displays may be used to display the game to the player.

As used herein, the term "player reward program" means a program by which players of games have the opportunity to be awarded rewards independent of the specific outcomes of the games they play. These types of programs may be given various names.

Figure 1A:
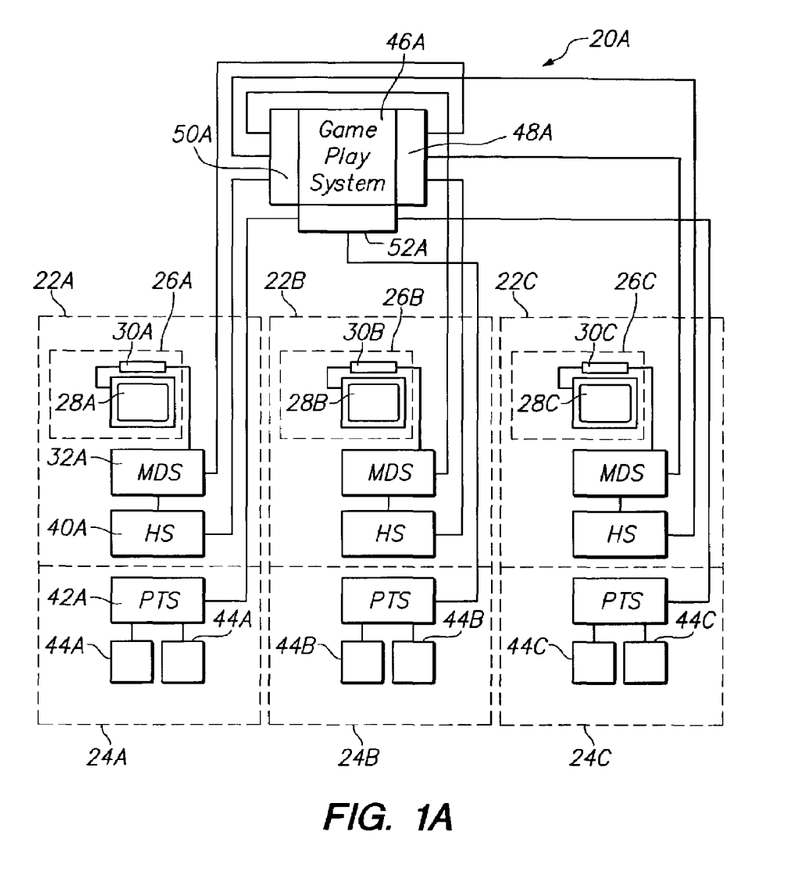
FIG. 1A illustrates an alternate embodiment of a system of the invention.

FIG. 1A illustrates a system 20A in accordance with another embodiment of the invention. This embodiment of the invention is similar in many respects to the system 20 illustrated in FIG. 1 and described above. As such, like reference numerals have been assigned to like elements, with the exception that the suffix "A" has been added. Details of these like elements are not provided again.

In this embodiment, the game play system 46A is configured as part of a wide area network or WAN which includes the media distribution system 32A, hospitality/ reservation system 40A and player tracking system 42A of multiple hotels/casinos. As illustrated, the game play system 46A is associated with three hotels (Hotel A, B and C) and three casinos (Casino A, B and C). It will be understood that the game play system 46A may be associated with a greater or lesser number of hotels/casinos and the sub-systems thereof.

In this embodiment, the game play system 46A is arranged to interface with the various sub-systems of the hotels/casinos. The game play system 46A is specifically configured to provide game data to the media distribution system 32A of each of the hotels, thereby permitting a game to be presented to a player on a promotional basis at any of the hotels.

One or more embodiments of the invention comprises a method of presenting a game in a promotional or demonstrative mode to a player. Various embodiments of the invention may be implemented using the system 20 described above. It will be appreciated, however, that other apparatus and systems may be used to implement the methods of the invention.

In general, in accordance with one embodiment of the invention, a guest is provided the opportunity to play one or more games on a promotional or demonstrative basis. In one embodiment, a guest who is a member of the player rewards program of an associated casino is permitted to access one or more games for play. The guest/player is entitled to earn credits or points for playing the games on a promotional or demonstrative basis. A guest who is not a member of the player rewards program is invited to join the program. Once the guest has joined the program, they are permitted to play the one or more games and earn credits or points.

In a preferred embodiment, the guest is provided the opportunity to play the one or more games from their hotel room. With respect to the system 20 described above, the guest is permitted to play one or more games via their in-room television 28.

Figure 2:
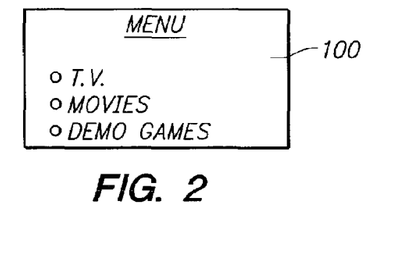
FIG. 2 illustrates one interface which may be displayed to a player as part of the system and method of the invention.
Figure 3:
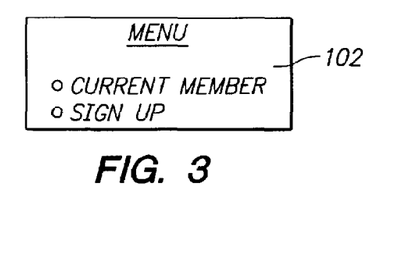
FIG. 3 illustrates another interface which may be displayed to a player as part of the system and method of the invention.
Figure 4:
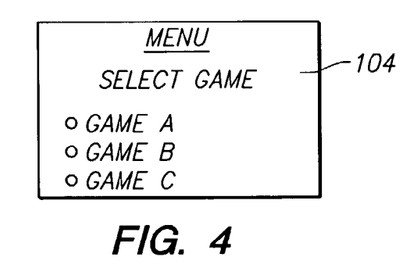
FIG. 4 illustrates yet another interface which may be displayed to a player as part of the system and method of the invention.

In one embodiment, various aspects of the methods of the invention may be implemented utilizing graphical user interfaces. These interfaces may be displayed to the guest/player via the television in their room. FIGS. 2–4 illustrate various interfaces which may be displayed to the player.

FIG. 2 illustrates one interface 100. This interface 100 comprises a main menu. This interface 100 may be displayed as a default screen when the television is turned on and unless a particular menu item is selected. The interface 100 may also be displayed in response to input from a player, such as by pressing a "menu" button on the remote control, keypad or the like associated with the television/ set-top box.

In the embodiment illustrated, the interface 100 indicates a plurality of main menu items. These main menu items may include, for example, "TV," "Movies" and "Demo Games." By selecting the "TV" menu item, the television may be caused to display television programming. This television programming may be provided through a television signal feed. The feed may be provided by antenna, cable or the like.

With respect to the system 20 illustrated in FIG. 1, the signal may be provided through the link 34 from the media distribution system 32. The player may use the tuner of the television or the attached set-top box to select particular television channels.

If the player selects the "Movies" menu selection, the player may be permitted to select one or more movies for viewing. For example, a variety of sub-menus may be displayed by which the player may select a particular movie. When the player selects a particular movie, a signal representing the movie is provided to the television. In the embodiment illustrated in FIG. 1, this signal may be provided via the media distribution system 32.

If the player selects the "Demo Games" menu, then the player may be permitted to play one or more games. Specific details of various embodiments of methods of permitting a player to play a game are detailed below.

In one embodiment, as illustrated in FIG. 3, when a player selects the "Demo Games" menu, a sub-menu is displayed. This sub-menu is displayed as part of a second interface 102. In one embodiment, this sub-menu presents the player with the menu options of "Current Member" or "Sign Up." These menu selections will be described in greater detail below, but in general permit a player to either join a player rewards program for the opportunity to play a game on a promotional or demonstrative basis, or to identify themselves as a current member of such a program.

Once the player has identified themselves as a current member of the player rewards program, signed up for the program, or is other wise entitled to play a game, another interface 104 may be displayed. As illustrated, this interface 104 may comprise a game menu listing one or more games which the player may play on a promotional or demonstrative basis.

It will be appreciated that the systems of the invention may be caused to generate and display, and the methods may be implemented using, a variety of graphical user interfaces. These interfaces may have a variety of forms and layouts. The interfaces may be generated and displayed in a variety of manners. In one embodiment, interface information may be transmitted from a remote location, such as the media distribution system 32 of the system 20 illustrated in FIG. 1. The interface information may also be stored or generated at the set-top box 30. In any event, the interface(s) comprise data which is provided to the television, causing the television to display visible information.

As described above, the system 20 may be permitted to allow the player to provide input. This input may be provided via the remote control 32 or a keypad or other device associated with the set-top box 30 or television 28. For example, the remote control 32 may include arrow keys which permit a user to scroll through menu items displayed by the television. Menu items which are scrolled to may be "highlighted" to visually identify to the player their selection. The player may make selections of particular highlighted menu items using an "enter" button on the remote control 32. The operation of such devices to make menu selections and the like is well known in the art.

Various embodiments of methods of the invention will now be described in more detail. In accordance with one embodiment of the invention, a player which is a member of a player rewards program is permitted to engage in promotional or demonstrative play of a game.

Figure 5:
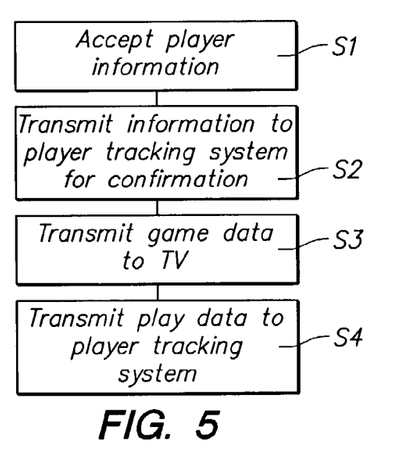
FIG. 5 is a flow diagram illustrating a method of the invention in which a game is presented to a player on a promotional or demonstrative basis.

FIG. 5 illustrates one embodiment of a method of the invention in which a player who is already a member of a player rewards system is permitted to engage in game play. In a first step S1, player identification information is accepted. This step may comprise, for example, the player entering their identification information using a remote control or keypad. The information may be provided in other manners, however. For example, in one embodiment, a card reader may be located in the room and associated with the set-top box or the like. A player may swipe their player rewards program card into the reader to provide the information. In another embodiment, the information may be accepted from the hospitality system of the hotel. For example, with respect to the system 20 illustrated in FIG. 1, the information may be provided from a data file stored at the hospitality system 40.

It will be appreciated that in order for the player to reach the step of providing player reward program identifying information, the player may have selected various menu items of various displayed interfaces. For example, the player may have selected the "Demo Games" menu item of the interface 100 illustrated in FIG. 2, and then the "Current Member" menu item of the interface 102 illustrated in FIG. 3. In response to this selection, an interface may be displayed to the player requesting that they input their name, password, identification number and/or other identifying information.

In one embodiment, once the player identification information is accepted, in a step S2 the information is transmitted to the player tracking system. In the embodiment of the system 20 illustrated in FIG. 1, the information is provided by the set-top box 30 via the link 34 to the media distribution system 32 to the game play system 46, and from the game play system 46 to the player tracking system 42. The accepted information is utilized by the player tracking system 42 to confirm the identity of the player as a member of the player rewards program.

If the player is not confirmed as a member of the program, a signal may be transmitted to the television requesting that the player re-enter their information, seek customer assistance, or sign up as a new member or the like. If the player is confirmed as a member of the program, then in a step S3, game data is provided to the television whereby a game is presented for play to the player.

This step may be implemented in a variety of fashions. Referring to FIG. 2, in one embodiment the player tracking system 42 may generate and send a signal to the game play system 46 when the player is confirmed as a member of the program. In response to this signal, the game play system 46 may send a signal via the media distribution system 32 to the player's in-room television causing the television to display the interface 104 illustrated in FIG. 4 or one similar thereto. The player may then select a game from the displayed menu. The game selection may be transmitted through the media distribution system 32 to the game play system 46.

In response to a particular game selection, the game play system 46 preferably provides game data for the particular game which was selected. This data is transmitted back through the media distribution system 32 to the television 28 of the player, causing the television to display the game.

In one embodiment, the game may require that the player provide input, such as card selections or the like. These inputs may be provided by the player using the remote control 32 or other input device. The inputs may be transmitted from the set-top box 30 through the media distribution system 32 to the game play system 46.

In one embodiment, player input and game data is exchanged between the set-top box 30 and game play system 46 in order to implement the game. The game may be implemented in other manners. For example, in one embodiment the set-top box 30 may include a processor and a memory. Game data may be uploaded from the game play system 46 to the set-top box 30 where the set-top box executes the data to implement the game. In this embodiment, instead of game data being provided as the game progresses, an entire block of data for implementing the game may be provided at the time the game is selected.

Preferably, the game or games which are presented to a player are of the type which would normally require a player to place a wager in order to play the game, and in which the player is provided an award if the outcome of the game is a winning outcome. As is known, the wager may comprise money, such as coins or paper currency, credit or the like. The award may similarly be coins, credits representing monetary value or the like.

In a preferred embodiment of the invention, the game is presented on a demonstrative or promotional basis. By this it is meant that the game is presented to the player without the player being required to pay specific monies or provide specific value in order to play the game.

In the preferred embodiment of the invention, while the player is not required to place a wager or bet in order to play the game, the player is also not paid an award or winnings if the outcome of the game is a winning outcome. Referring again to FIG. 5, in one embodiment of the method in a step S4, the game play is, however, tracked.

In accordance with this step, game play information is transmitted to the player tracking system. The game play information is associated with the player, such as by updating a player file. The game play information which is provided may comprise a variety of information, such as the number of games played, outcomes of games or the like. Referring to FIG. 1, in one embodiment the game play system 46 is configured to generate game play information and transmit it to the player tracking system 42. The game play information may be generated in accordance with specifically defined criteria. For example, the game play system 46 may be arranged to generate point information corresponding to the promotional or demonstrative play of particular games. This point information may be transmitted to the player tracking system 42 to update a player's point total.

Figure 6:
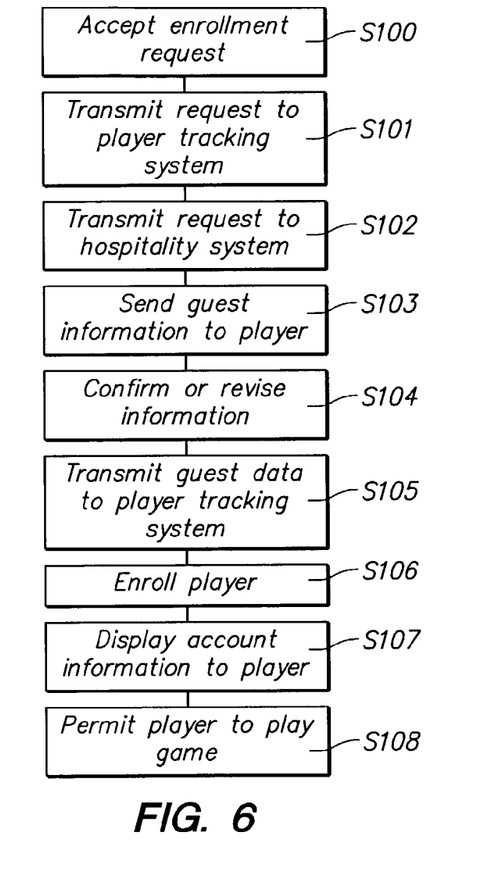
FIG. 6 is a flow diagram illustrating another method of the invention in which a player is enrolled in a player rewards program in order to be entitled to play a game on a promotional or demonstrative basis.

One embodiment of a method by which a player who is not currently a member of the player reward program is permitted to play a game will be described with reference to FIG. 6. As illustrated, in a first step S100, a request is accepted to enroll the player with the player rewards program. This request may be accepted in a variety of manners. Referring to FIG. 3, a guest may select the "Sign Up" menu selection of the display interface 102.

In a step S101, the request is transmitted to a player tracking system, such as the player tracking system 42 of the system 20 illustrated in FIG. 1. In this system 20, the request is transmitted via the media distribution system 32 to the game play system 46, and then to the player tracking system 42.

In a step S102, the player tracking system then generates a request for player identification information. With respect to the system 20 illustrated in FIG. 1, when the player tracking system 42 receives the request, the player tracking system 42 may confirm that the guest is currently not a member of the player rewards program. The player tracking system 42 may then send a request to the hospitality system 40 for information.

In a step S103, player information is preferably provided to the player for verification. Referring to FIG. 1, this step may comprise the hospitality system 40 transmitting player information via the media distribution system 32 to the player's in-room television 28 for display. The player information may comprise the player's name, address, telephone number and/or other information which is stored at the hospitality system 40, such as provided by the player at check-in or by reservation.

In a step S104, the player confirms or revises the provided information. This step preferably simply allows the player to ensure that the information which is to be used to enroll the player in the player rewards program is accurate.

In a step S105, if the information is correct or once it has been corrected, the information is transmitted to the player tracking system. Referring again to FIG. 1, this step may comprise the hospitality system 40 providing the guest/player's name, address, telephone number and/or other information which is stored in that system, to the player tracking system 42.

In a step S106, the player is enrolled in the player rewards program. This step may comprise the opening of an account for the player, including the generation of an assigned identification number or code. The account may be generated and stored as a file at the player tracking system.

In a step S107, player enrollment information is preferably displayed to the player. In the system 20 illustrated in FIG. 1, this step may comprise the player tracking system 42 transmitting information regarding the identity of the player and their player reward program identification number or code via the game play system 46 and media distribution system 32 to the player's in-room television 28 for display to the player. In this manner, the player can confirm that they have been enrolled and the player is provided account information for later use.

In a step S108, the player is then permitted to play one or more games on a promotional or demonstrative basis. This step may comprise the multiple steps implementing game play illustrated in FIG. 5 and described above.

A variety of variations of the methods and systems of the invention are contemplated. As indicated, in a preferred embodiment of the invention, a game is presented on a promotional or demonstrative basis to a player in the room of a hotel. It will be appreciated that the terms "hotel" and "room" and the applicability of the invention extends beyond the preferred embodiment described. For example, the term "hotel" may include hotels, motels, lodges, cruise ships and other places where lodging or other space is provided to a party. The term "room" is not limited to a hotel room, but may comprise a cruise-ship cabin or other space. In general, the invention includes any space or area at which the player may be located. Preferably this space is separate or remote from the casino at which the new or other game may be presented on a non-promotional basis.

While referred to as separate elements, various of the components of the system of the invention may be combined. For example, while the television or other display has been described separately from the media distribution system, the television or display in each room or other location may be considered part of the media distribution system. The media distribution system and hospitality/reservation system may be combined into a unitary system or share various common components.

In one embodiment of a method of enrolling a non-member player into the player rewards program in order to be entitled to play a game, the player may be required to verify their identity. For example, referring to FIG. 6, step 104 may include the step of the player confirming their identity in order to confirm their player enrollment. This step may comprise, for example, the player inputting their Social Security Number, or their address or the like.

In one embodiment of the invention, as described above, a player may be awarded points based upon their promotional or demonstrative play of a game or games. In one embodiment, points may be based upon the amount of time spent playing those games. The points may be awarded based upon other criteria, however. These criteria may include number of games played or the like.

In one embodiment, a player may be awarded a reward by simply playing a game at a particular time. Rewards may be generated and awarded randomly to one or more players of the games. The reward may be a number of points or be a specific prize.

The game or games which may be presented to a player may be of a variety of types. In one embodiment, the games may be of the type presented on a video-type gaming machine. The games may be table-type games, or games of the type presented on electromechanical devices, such as reel-type slot machines. In these latter cases, the table or slot game may be simulated or converted to a video format or the like permitting presentation on the television.

The methods and systems of the present invention have numerous advantages. In accordance with the invention, new games are introduced to players. The new games are introduced on a promotional or demonstrative basis, enticing players to play the game by permitting them to play the game without the normal attendant risk of losing the game.

Further, the games are presented for play in a convenient location. Instead of a player having to find the new game on the floor of a casino, the game is presented to the player in the player's room. The player is exposed to an opportunity to play the game on a promotional or demonstrative basis when the player uses their in-room television. The player is permitted to play the game from their room.

As one aspect of the invention, a player who is already a member of a player rewards program is enticed to play games on a promotional or demonstrative basis while still participating in the rewards program. The player is entitled to earn rewards for playing the games separate from the actual outcomes of the games. These rewards may comprise points awarded for playing the games, or awards received based upon the award of points.

Players who are not enrolled in the player tracking system are enticed to join the system. In this manner, the casino gains new members to their player tracking system.

One advantage of the system is that it, in many instances, may be implemented using a large amount of existing equipment. For example, the hotel likely already has an existing media distribution system linked to televisions in each of the rooms, as well as a hospitality/reservation system. In accordance with the invention, the method may be implemented by linking these systems to an existing player tracking system of a casino, as well as a game play system as described above.

It will be understood that the above described arrangements of apparatus and the method therefrom are merely illustrative of applications of the principles of this invention and many other embodiments and modifications may be made without departing from the spirit and scope of the invention as defined in the claims.

What is claimed is:

1. A system for providing a game on a free tutorial basis, the game of the type normally requiring that a wager or bet be placed to play the game, the system comprising:

a media distribution system, said media distribution system including a plurality of displays located in a plurality of guest rooms, the media distribution system configured to direct data to each of the displays;

a hospitality system configured to store information regarding guests utilizing said guest rooms;

a first link connecting said hospitality system to said media distribution system, said first link permitting information to be transmitted between said hospitality system and media distribution system;

a player tracking system adapted to track the play of one or more games by players enrolled in a player reward system;

a game play system, said game play system adapted to provide game data corresponding to a game to be presented to a player on a free tutorial basis without payment of a bet or wager of anything of value, wherein a number of player rewards program points having value are awarded to said player based on the free tutorial play of said game without payment of a bet or wager;

a second link connecting said game play system and said player tracking system, said second link permitting game play information to be provided from said game play system to said player tracking system; and a third link connecting said game play system and said media distribution system, said third link permitting said game play data to be provided to said one or more displays to present said game at said display.

2. The system in accordance with claim 1 including a fourth link connecting said game play system and said hospitality system, said fourth link permitting guest information to be transmitted from said hospitality system to said game play system and then from said game play system to said player tracking system via said second link for enrolling a player in a player rewards program.

3. The system in accordance with claim 1 including a set-top box associated with each display, said set-top box including means for accepting input from a user.

4. The system in accordance with claim 1 wherein said player tracking system is associated with a casino having a plurality of gaming machines configured to provide game play data to said player tracking system.

5. A method of presenting a game to a player on a free tutorial basis, said game of the type normally requiring that the player place a wager or bet in order to play the game, the game presented to the player at a display located in a guest room of a hotel comprising the steps of:

accepting identification information from said player;

transmitting said information via a media distribution system to a player tracking system;

identifying said player as a member of a player rewards program;

providing game data from a game play system to said media distribution system in response to the identification of said player as a member of said player rewards program;

transmitting said game data to said display;

presenting said game to said player at said display on a free tutorial basis without payment of a bet or wager of anything of value;

transmitting game play data to said player tracking system;

associating said game play data with a player rewards program corresponding to said player; and increasing a number of player rewards program points assigned to said player, said player rewards points having a value used to award the player a reward independent of the outcome of said game.

6. The method in accordance with claim 5 including a set-top box associated with said display, said identification accepted via input to said set-top box.

7. The method in accordance with claim 5 wherein said identification information comprises a player rewards program identifier.

8. The method in accordance with claim 5 wherein said game play data represents one or more points awarded to said player.

9. A method of presenting a game to a player on a free tutorial basis, said game of the type normally requiring that the player place a wager or bet in order to play the game, the game presented to the player at a display located in a guest room of a hotel comprising the steps of:

accepting a request from a player indicating a desire to play a game;

transmitting player identification information from a hospitality system to a player tracking system;

enrolling said player in a player rewards program;

providing game data from a game play system to a display located in said player's room;

presenting a game using said game data, said game presented on a free tutorial basis without payment of a bet or wager;

transmitting game play data to said player tacking system; and associating said game play data with a player rewards program, wherein said associating step comprises increasing a number of points assigned to said player, said points used to award a player a reward independent of the outcome of said game.

10. The method in accordance with claim 9 wherein said game play data comprises information defining one or more points.

11. The method in accordance with claim 9 wherein said game data is transmitted from said game play system to said player's room via a media distribution system.

12. The method in accordance with claim 9 including the step of transmitting said request from said player over a media distribution system to said player tacking system, generating a request for player identification and transmitting said request for player identification information from said player tracking system to said hospitality system.

13. A method of presenting a game to a player on a free tutorial basis, said game of the type normally requiring that the player place a wager or bet in order to play the game comprising:

confirming that the player is a member of a player rewards program;

transmitting game data from a game play system through a media distribution system of a hotel to a display located in a guest room where said player is located;

presenting a game on a free tutorial basis to said player in said room on said display, said game of the type normally requiring that a player place a bet or wager to play the game, said game presented without the player placing a wager or bet to play the game; and transmitting information regarding the play of said game to a player tracking system, said information for use in providing a reward to said player independent of the outcome of the game, wherein said information regarding the play of said game comprises information representing one or more player rewards points awarded to said player.

14. The method in accordance with claim 13 wherein said step of confirming comprises accepting player identification information and utilizing said player identification information to confirm said player is a member of said player rewards program.

15. The method in accordance with claim 13 wherein said step of confirming comprises enrolling said player in said player rewards program.

16. The method in accordance with claim 15 wherein said step of enrolling comprises transmitting player identification information from a hospitality system storing information regarding said player associated with said player's use of said guest room to said player tracking system.

17. A system adapted to provide a game on a free tutorial basis, the game of the type normally requiring that a wager be placed to play the game, comprising:
- a media distribution system, said media distribution system including a plurality of displays and configured to direct data to one or more of the displays;
- a player tracking system in communication with said media distribution system, said player tracking system adapted to track the play of and award player rewards points for the play of one or more wager based games associated with the player tracking system; and
- a game play system in communication with said media distribution system and adapted to provide game data corresponding to said normally wager based game to be presented to a player at one or more of said plurality of displays on a free tutorial basis without requiring said player to tender a wager of anything of value, wherein a number of player rewards points are awarded to said player based on the play of said normally wager based game without the tender of a wager of anything of value.

18. The system in accordance with claim 17, wherein said media distribution system includes a plurality of displays located in a plurality of guest rooms.

19. The system in accordance with claim 18, further including a set-top box associated with each said display located in a guest room, wherein each said set-top box includes means for accepting input from a user.

20. The system in accordance with claim 17, wherein said player tracking system is associated with a casino having a plurality of gaming machines configured to provide game play data to said player tracking system.

* * * * *